US008135396B2

(12) United States Patent
Terabe et al.

(10) Patent No.: US 8,135,396 B2
(45) Date of Patent: Mar. 13, 2012

(54) WIRELESS COMMUNICATION TERMINAL AND METHOD

(75) Inventors: Shigeo Terabe, Hachioji (JP); Kengo Kurose, Hamura (JP); Yutaka Asanuma, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 514 days.

(21) Appl. No.: 12/398,362

(22) Filed: Mar. 5, 2009

(65) Prior Publication Data

US 2009/0239524 A1 Sep. 24, 2009

(30) Foreign Application Priority Data

Mar. 19, 2008 (JP) ................................. 2008-071577

(51) Int. Cl.
*H04W 24/00* (2009.01)

(52) U.S. Cl. ..................... 455/423; 455/452.1; 455/436; 455/458

(58) Field of Classification Search ................ 455/452.1, 455/436, 458
See application file for complete search history.

(56) References Cited

U.S. PATENT DOCUMENTS

2007/0232314 A1* 10/2007 Kolding et al. ............... 455/436
2008/0045231 A1* 2/2008 Kuroda et al. ............. 455/452.1

FOREIGN PATENT DOCUMENTS

EP 1892875 A2 * 2/2008

OTHER PUBLICATIONS

Tdoc R1-073933; Mitsubishi Electric "Selection of CQI Reporting Scheme"; Oct. 2007; pp. 1-7.

\* cited by examiner

*Primary Examiner* — David Q Nguyen
(74) *Attorney, Agent, or Firm* — Maschoff Gilmore & Israelsen

(57) ABSTRACT

A wireless communication terminal includes a measuring unit configured to measure each of channel qualities of resource blocks that a base station can allocate, a generating unit configured to divide the resource blocks into a plurality of groups, to generate quality data representing the channel qualities of a prescribed number of resource blocks included in each of the groups, which have relatively high channel quality, and to generate position data representing the positions which the resource blocks which have relatively high channel quality take in each of the groups, an encoding unit configured to encode the quality data and the position data to obtain encoded data, a modulation unit configured to modulate the encoded data to obtain a modulated signal, and a transmitting unit configured to transmit the modulated signal to the base station.

19 Claims, 9 Drawing Sheets

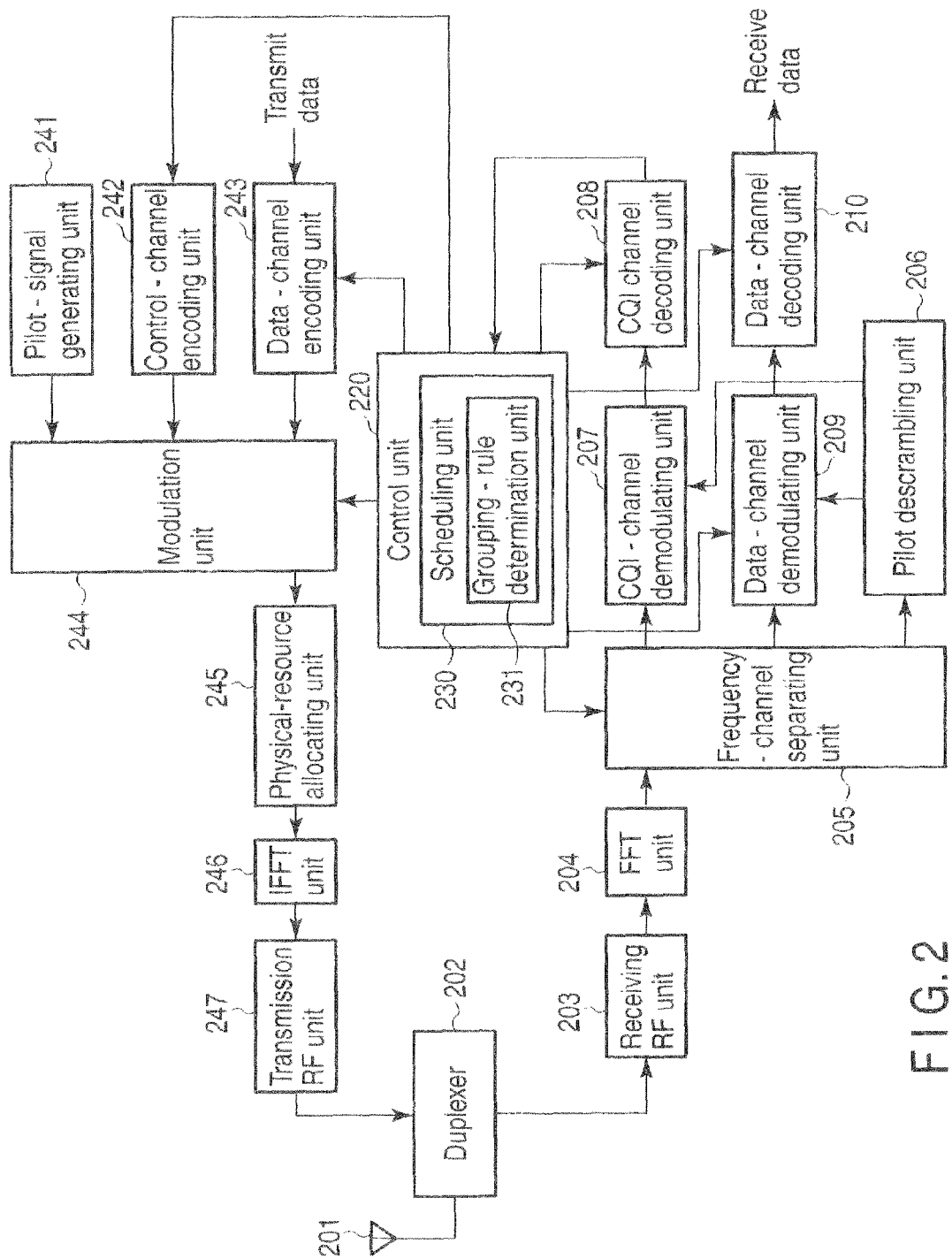
F I G. 2

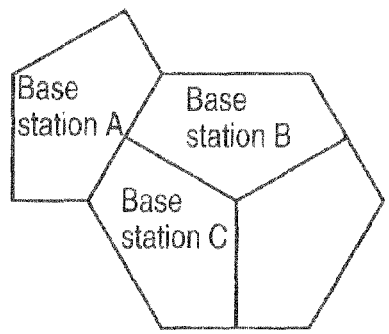
F I G. 1 3
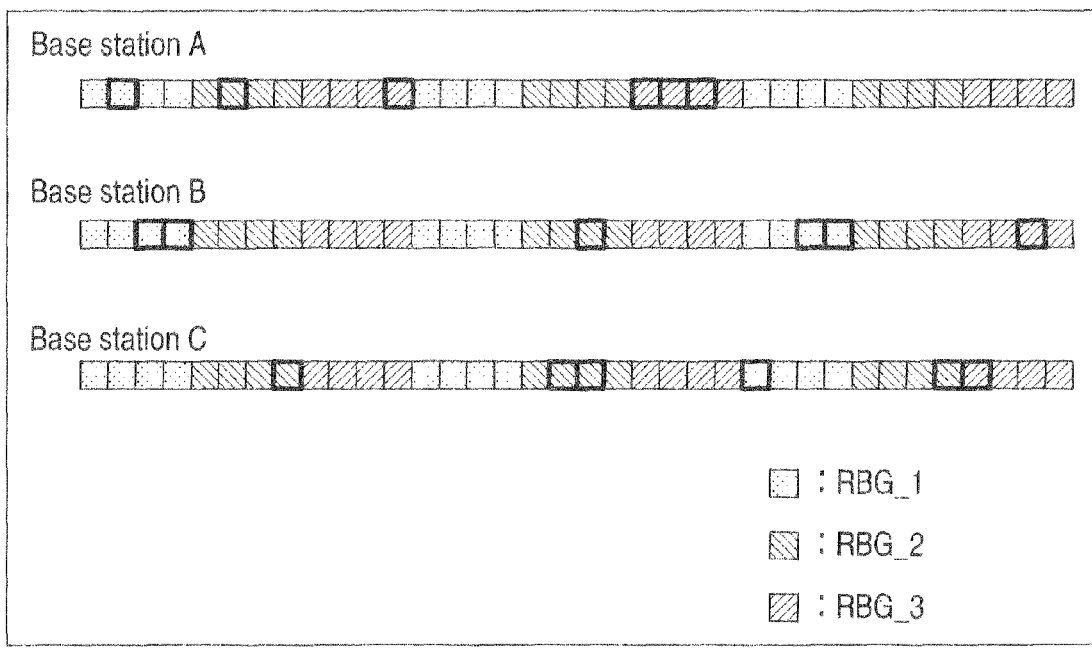
F I G. 1 4

WIRELESS COMMUNICATION TERMINAL AND METHOD

CROSS-REFERENCE TO RELATED APPLICATIONS

This application is based upon and claims the benefit of priority from prior Japanese Patent Application No. 2008-071577, filed Mar. 19, 2008, the entire contents of which are incorporated herein by reference.

BACKGROUND OF THE INVENTION

1. Field of the Invention

This present invention relates to a wireless communication terminal for use in mobile communication systems.

2. Description of the Related Art

In the conventional mobile communication system that employs adaptive modulation, a mobile station measures the channel quality for the base station that remains in the best receiving state and then feeds the channel quality back to the base station. The data fed back to the base station is called channel quality indicator (CQI). From the CQI the base station determines a combination of transmission formats, a modulation scheme, an encoding rate and a transmission power, all for data communication with the mobile station. Then, the base station notifies this combination of data items to the mobile station.

The base station appropriately switches the transmission format adaptively, in accordance with the CQI fed from the mobile station. The base station then transmits a data item on the data channel dedicated to it. That is, a transmission rate in accordance with an error resilience adapted to the receiving state is allocated to the communication between the base station and each mobile station. In some cases, the mobile station may determine the transmission format from the channel quality it has measured and may then notify this transmission format to the base station.

A plurality of resource blocks that the base station can allocate to the mobile station may be available at the same time. If this is the case, the mobile station measures the channel quality of every resource block and notifies the CQI to the base station. In a mobile communication system that employs, for example, orthogonal frequency division multiple access (OFDMA), the communication between the base station and each mobile station is performed by using, at the same time, subcarriers obtained by dividing the carrier frequency (i.e., system band). More precisely, the base station adaptively switches the allocation of resources and the transmission format in accordance with the CQI transmitted from each mobile station. Each mobile station can have an improved throughput because the base station allocates a resource of good channel quality to it. Moreover, the base station can enhance the system throughput because it allocates the resource preferentially to any mobile station that stays in a relatively good receiving state.

For any communication system that employs OFDMA, an increase in signaling overhead of CQI, which occurs as resources that can be allocated increase in number, is a great problem. R1-07393 3-Mitsubishi Electric, "Selection of CQI reporting scheme," 3GPP TSG RAM WGI, #50bis describes a BestM scheme as a CQI notifying scheme. A mobile station employing the BestM scheme selects M resources among the resources that can be allocated which have good channel quality. The mobile station then notifies the base station of the positions of the M resource blocks and the value representing the channel quality of the M resource blocks. (This value is, for example, the average channel quality of M channels or the minimal channel quality among the M channels.) With the BestM scheme it is possible to reduce the amount of data involved in the CQI notification.

The BestM scheme can indeed reduce the data amount of the CQI better than the scheme of notifying the channel quality of every resource block that can be allocated. In the BestM scheme, however, not only the channel quality, but also the positions of the M resource blocks selected must be notified. If N resource blocks can be allocated, at least log2 (C(N,M) bits are required to notify the positions of the M resources blocks, even if the value of M is already known to the base station.

To schedule the allocation of the resources from the base station to each mobile station, various conditions other than channel quality are taken into account. For example, the base station minimizes the signaling for notifying the resource block allocation to each mobile station. Alternatively, the base station may perform scheduling in order to avoid interference between geographically adjacent cells. Hence, there may be resource blocks (bands) that the base station should not allocate to any mobile stations. In the BestM scheme, a resource block is selected in accordance with its channel quality and is then notified to the base station. Consequently, resource blocks selected may be allocated to a band to which the base station should not allocate them. If this happens, the degree of freedom of scheduling the allocation of resources may inevitably be limited.

BRIEF SUMMARY OF THE INVENTION

Accordingly, an object of this invention is to provide a mobile communication system that can preserve the degree of freedom in scheduling the allocation of resources.

According to an aspect of the invention, there is provided a wireless communication terminal comprising: a measuring unit configured to measure each of channel qualities of resource blocks that a base station can allocate; a generating unit configured to divide the resource blocks into a plurality of groups, to generate quality data representing the channel qualities of a prescribed number of resource blocks included in each of the groups, which have relatively high channel quality, and to generate position data representing the positions which the resource blocks which have relatively high channel quality take in each of the groups; an encoding unit configured to encode the quality data and the position data to obtain encoded data; a modulation unit configured to modulate the encoded data to obtain a modulated signal; and a transmitting unit configured to transmit the modulated signal to the base station.

According to another aspect of the invention, there is provided a wireless communication terminal comprising: a measuring unit configured to measure each of channel qualities of resource blocks that a base station can allocate; an acquiring unit configured to acquire a grouping ruse; a generating unit configured to divide the resource blocks into a plurality of groups in accordance with the grouping rule, to generate quality data representing the channel qualities of a prescribed number of resource blocks included in each of the groups, which have relatively high channel quality, and to generate position data representing the positions which the resource blocks which have relatively high channel quality take in each of the groups; an encoding unit configured to encode the quality data and the position data to obtain encoded data; a modulation unit configured to modulate the encoded data to obtain a modulated signal; and a transmitting unit configured to transmit the modulated signal to the base station.

BRIEF DESCRIPTION OF THE SEVERAL VIEWS OF THE DRAWING

FIG. 2 is a block diagram showing the base station of the mobile communication system according to the first embodiment;

FIG. 13 is a diagram explaining the geographical condition the base station assumes in the mobile communication system according to an eighth embodiment of the present invention; and FIG. 14 is a diagram explaining the grouping rule determined by each base station that assumes the geographical condition of FIG. 13.

DETAILED DESCRIPTION OF THE INVENTION

Embodiments of the invention will be described with reference to the accompanying drawings.

(First Embodiment)

Figure 3:
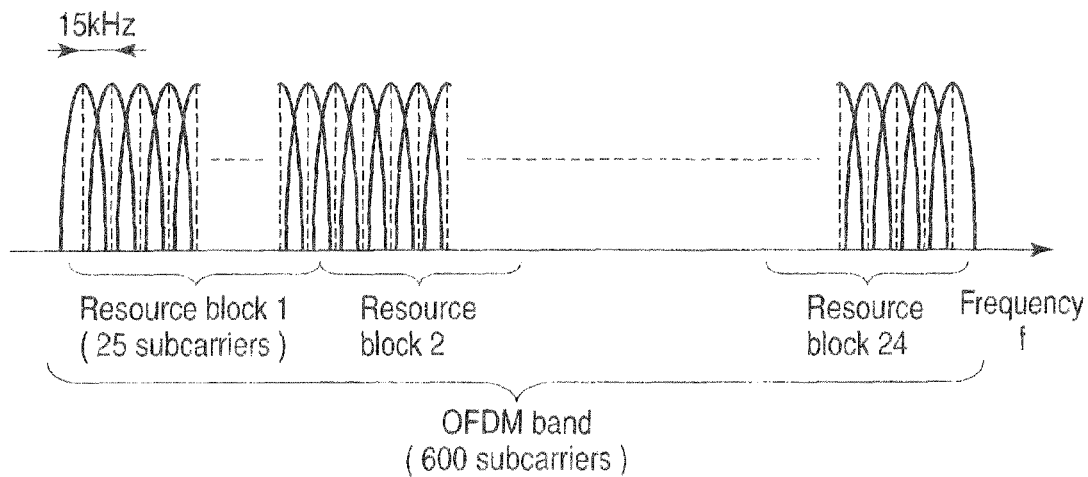
FIG. 3 is a diagram showing the resource blocks that can be allocated to a mobile station in the mobile communication system according to the first embodiment.

The mobile communication system according to a first embodiment of the invention employs the OFDM modulation method. In the OFDM modulation method, a high-rate data signal is converted to a low-rate data signal of a narrow band. The method uses a plurality of subcarriers that are orthogonal to each other, thus transmitting a data signal that is multiplexed on the frequency axis. Assume that the OFDM band is composed of 600 subcarriers, each differing by 15 kHz from either adjacent one, as shown in FIG. 3, in the mobile communication system according to this embodiment. Also assume that the base station can allocate the subcarriers (for example, 25 subcarriers) to each mobile station, in the form of a resource block.

Figure 1:
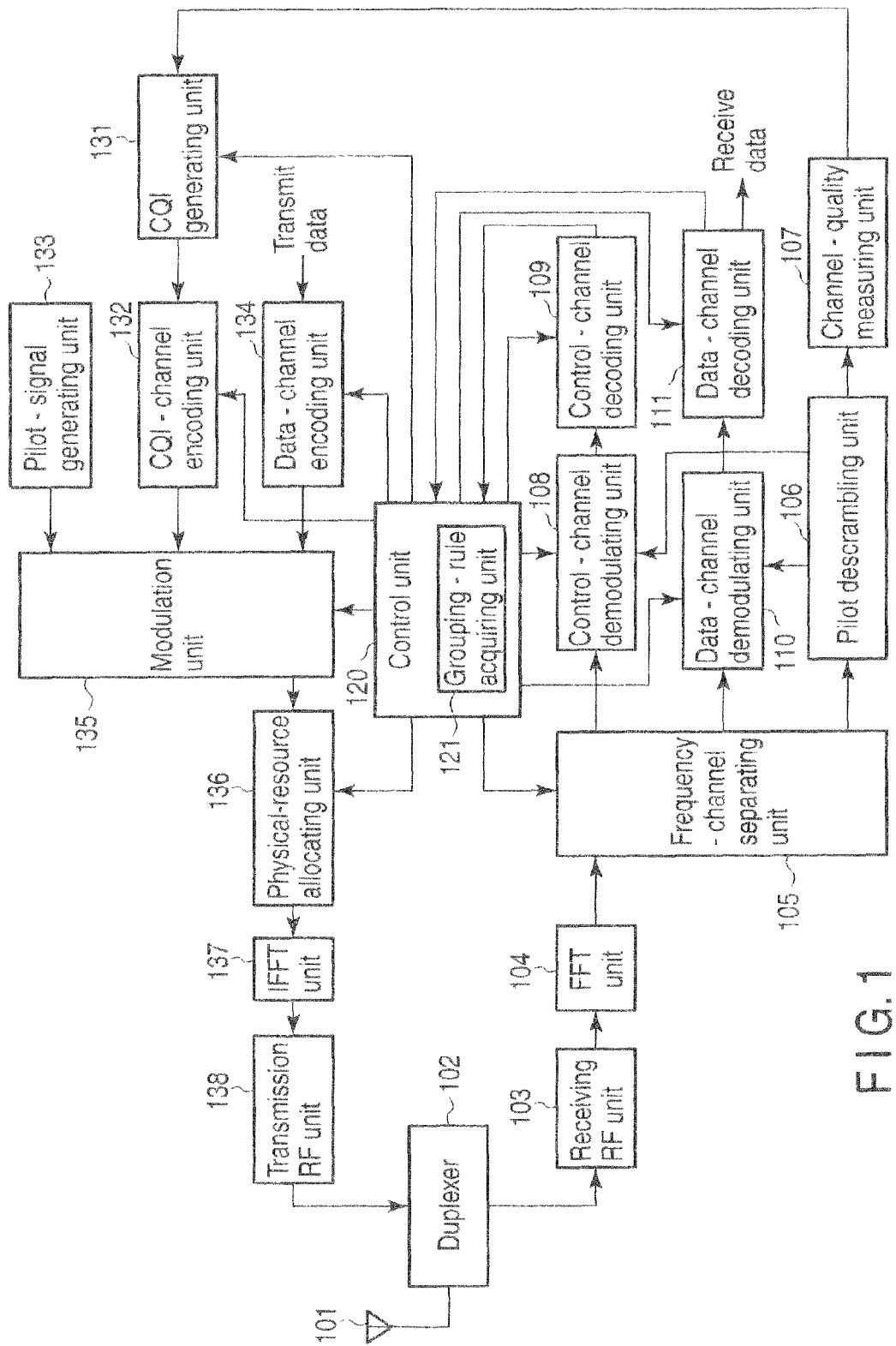
FIG. 1 is a block diagram showing a mobile station in the mobile communication system according to a first embodiment.

As FIG. 1 shows, each mobile station of the mobile communication system according to the first embodiment comprises an antenna 101, a duplexer 102, a receiving RF unit 103, a fast Fourier transform (FFT) unit 104, a frequency-channel separating unit 105, a pilot descrambling unit 106, a channel-quality measuring unit 107, a control-channel demodulating unit 108, a control-channel decoding unit 109, a data-channel demodulating unit 110, a data-channel decoding unit 111, a control unit 120, a CQI generating unit 131, a CQI-channel encoding unit 132, a pilot-signal generating unit 133, a data-channel encoding unit 134, a modulation unit 135, a physical-resource allocating unit 136, an inverse fast Fourier transform (IFFT) unit 137, and a transmission RF unit 138.

The antenna 101 receives a radio signal transmitted from the base station, which will be described later, and outputs a received signal. The received signal is input to the receiving RF unit 103 via the duplexer 102. The antenna 101 may receive a radio signal from the transmission RF unit 138, which will be described later, and outputs the radio signal to the base station.

The receiving RF unit 103 includes a low-noise amplifier (LNA), a down-converter, and an analog-to-digital converter (ADC). The receiving RF unit 103 receives the signal from the duplexer 102. In the receiving RF unit 103, the LNA adjusts the gain of the received signal. The down-converter performs down conversion on the signal. The ADC converts the down-converted signal to a digital signal (hereafter referred to as digital received base-band signal). The digital received base-band signal is input to the FET unit 104.

The FET unit 104 performs fast Fourier transform on the digital-received base-band signal coming from the receiving RF unit 103. The digital received base-band signal, which is a signal in a time domain, is thereby converted to a signal in a frequency domain. The signal in a frequency domain is divided into subcarriers. The signals to be transmitted to the moving stations (i.e., one mobile station and other mobile stations), respectively, on the respective subcarriers, are multiplexed by means of orthogonal frequency-division multiplexing. The signals, on which the subcarriers are superposed, are input to the frequency-channel separating unit 105.

The frequency-channel separating unit 105 separates the signal on each subcarrier, which is supplied from the FET unit 104, into a pilot-channel signal, a control-channel signal and a data-channel signal. The control unit 120 (described later) notifies the frequency-channel separating unit 105 of which subcarriers correspond to the pilot channel, the control channel and the data channel, respectively.

More precisely, the frequency-channel separating unit 105 inputs the signal on the subcarrier associated with the pilot channel notified by the control unit 120, as a pilot-channel signal, to the pilot descrambling unit 106. Further, the frequency-channel separating unit 105 inputs the signal on the subcarrier representing the control channel notified by the control unit 120, as a control-channel signal, to the control-channel demodulation unit 108. Moreover, the frequency-channel separating unit 105 inputs the signal on the subcarrier associated with the data channel notified by the control unit 120 to data-channel demodulating unit 110. This signal is used as a data-channel signal.

Using a prescribed descrambling code, the pilot descrambling unit 106 descrambles a pilot channel signal supplied from the frequency-channel separating unit 105. The descrambling code has been generated by inverting the scrambling code that has been used to scramble the pilot data in the base station. The pilot channel signal the pilot descrambling unit 106 has descrambled is sent, as a pilot signal, to the channel-quality measuring unit 107 and the data-channel demodulating unit 110.

The channel-quality measuring unit 107 measures the channel quality of each resource block, from the pilot signal supplied from the pilot descrambling unit 106. The position data about the resource block the channel quality of which has been measured by the channel-quality measuring unit 107 and the measured channel quality about the resource block are supplied to the CQI generating unit 131.

The control-channel demodulation unit 108 has already been notified of the channel number and modulation scheme of the control channel signal to be extracted, by the control unit 120. Using the pilot signal supplied from the pilot descrambling unit 106, the control-channel demodulation unit 108 performs channel equalization on the control channel signal input from the frequency-channel separating unit 105. Then, the control-channel demodulation unit 108 demodulates the control channel signal now channel-equalized, in the demodulation scheme notified by the control unit 120. The control channel signal thus demodulated is input as a control signal to the control-channel decoding unit 109.

The control-channel decoding unit 109 receives the control signal from the control-channel decoding unit 109 and decodes the control signal in the encoding scheme for the control signal, thus generating control data. The control data is supplied to the control unit 120. Note that the control unit 120 has given the control-channel decoding unit 109 the data required in the decoding that represents the encoding scheme (e.g., encoding rate or the like). The data representing the encoding scheme is, for example, fixed data used in the mobile communication system according to this embodiment. Alternatively, this data may be acquired from the base station before the communication starts.

Using the pilot signal supplied from the pilot descrambling unit 106, the data-channel demodulating unit 110 performs channel equalization. After performing the channel equalization, the data-channel demodulating unit 110 demodulates the data channel signal input from the frequency-channel separating unit 105, thereby generating a data signal. The data signal is input to the data-channel decoding unit 111.

The data-channel decoding unit 111 receives the data signal generated by the data-channel demodulating unit 110 and decodes this signal in accordance with the encoding scheme for the data signal. Thus, the unit 110 reproduces the data (down data) received from the base station. As indicated above, the data representing the encoding scheme has already been supplied from the control unit 120 to the data-channel decoding unit 111.

The control unit 120 controls some of the other components of the mobile station of FIG. 1. The control unit 120 includes a grouping-rule acquiring unit 121.

More precisely, the control unit 120 controls the data-channel demodulating unit 110 and the data-channel decoding unit 111. From the control data supplied from the control-channel decoding unit 109, the control unit 120 determines whether the signal received for each subframe is addressed to the mobile station. If the signal is addressed to the mobile station, the control unit 120 extracts signaling data from the control data. From the signaling data the control unit 120 extracts data necessary for demodulating and decoding the data channel signal. The data thus extracted is input to the data-channel demodulating unit 110 and the data-channel decoding unit 111. The signal received may not be addressed to the mobile station. In this case, the control unit 120 causes the data-channel demodulating unit 110 and the data-channel decoding unit 111 to stop operating.

The grouping-rule acquiring unit 121 acquires a grouping rule and inputs the data representing this rule to the CQI generating unit 131. The grouping rule has been set by the base station and is applied to divide allocable resources into a plurality of groups. The grouping-rule acquiring unit 121 may acquire the grouping rule on the basis of the control data supplied from the control-channel decoding unit 109. Alternatively, the grouping-rule acquiring unit 121 may acquire the grouping rule from the base station before the mobile station starts communication with the base station.

The CQI generating unit 131 generates a CQI from the channel quality the channel-quality measuring unit 107 has measured of each resource block and the position data about the resource block, in accordance with the grouping rule supplied from the grouping-rule acquiring unit 121. The CQI thus generated is input to the CQI-channel encoding unit 132.

More specifically, the CQI generating unit 131 divides N allocable resource blocks (N being a natural number) into L groups (L being a natural number equal to or greater than 2, but smaller than N). In the description that follows, any group of resource blocks will be called a resource-block group (RBG), and will be identified with a group number. The ith resource-block group RBG_i (i being a natural number equal to or smaller than L) is composed of P_i resource blocks (P_i being a natural number smaller than N). The size P of each resource block group satisfies the following conditional equation (1):

$$\sum_{i=1}^{L} P\_i = N \tag{1}$$

The CQI generating unit 131 selects Ma_i resource blocks (Ma_i being a natural number equal to or smaller than P_i), each having high channel quality, from the ith resource-block group RBG_i. In other words, the CQI generating unit 131 selects Ma resource blocks having high channel quality each, from each resource-block group. The CQI generating unit 131 generates data representing the channel quality of each resource block selected, and data representing the position the resource block takes in the resource-block group. The CQI generating unit 131 inputs the data about each resource-block group, as CQI, to the CQI-channel encoding unit 132.

The CQI-channel encoding unit 132 encodes the CQI supplied from the CQI generating unit 131, in the encoding scheme the control unit 120 has notified. The data encoded by the CQI-channel encoding unit 132 (hereinafter called CQI signal) is input to the modulation unit 135.

The pilot-signal generating unit 133 applies a prescribed scrambling code to the bit sequence (pilot data) that is known to the base station, thereby generating a pilot signal. The pilot signal thus generated is input to the modulation unit 135.

The data-channel encoding unit 134 encodes the data (up data) to transmit to the base station, in the encoding scheme the control unit 120 has notified. The data encoded by the data-channel encoding unit 134 (hereinafter called data signal) is input to the modulation unit 135.

The modulation unit 135 modulates the CQI signal, pilot signal and data signal supplied from the CQI-channel encoding unit 132, pilot-signal generating unit 133 and data-channel encoding unit 134, respectively. The modulation scheme that the modulation unit 135 uses is a digital modulation scheme such as quadrature phase shift keying (QPSK) and is instructed by the control unit 120. The modulated CQI signal (the CQI channel signal), the modulated pilot signal (the pilot channel signal) and the modulated data signal (the data channel signal) are input to the physical-resource allocating unit 136.

The physical-resource allocating unit 136 allocates the subcarriers notified by the control unit 120, to the CQI channel signal, pilot channel signal and data channel signal supplied from the modulation unit 135. To allocate the subcarriers to these signals is to apply subcarrier indices that represent the positions the subcarriers have on the time axis in the associated resource blocks. The physical-resource allocating unit 136 inputs signals, which have been allocated to the physical resource, to the IFET unit 137.

The IFET unit 137 performs inverse fast Fourier transform on the signals allocated to a physical resource and supplied from the physical-resource allocating unit 136. That is, the signals allocated to the physical resource, which are signals in a frequency domain, are converted to a signal in a time domain. The signal in the time domain, coming from the IFET unit 137, is input to the transmission RF unit 138.

The transmission RF unit 138 includes a digital-to-analog converter (DAC), an up-converter, and a power amplifier (PA). In the transmission RF unit 138, the DAC receives the signal in the time domain and converts the same to an analog signal. The up-converter performs up-conversion on the analog signal, generating a radio signal. The PA amplifies the radio signal. The transmission RF unit 138 supplies the radio signal to the antenna 101. The antenna 101 transmits the radio signal in the form of a radio wave.

As shown in FIG. 2, the base station that is used in the mobile communication system according to this invention has an antenna 201, a duplexer 202, a receiving RF unit 203, an FFT unit 204, a frequency-channel separating unit 205, a pilot descrambling unit 206, a CQI-channel demodulating unit 207, a CQI channel decoding unit 208, a data-channel demodulating unit 209, a data-channel decoding unit 210, a control unit 220, a pilot-signal generating unit 241, a control-channel encoding unit 242, a data-channel encoding unit 243, a modulation unit 244, a physical-resource allocating unit 245, an IFFT unit 246, and a transmitting RF unit 247.

The antenna 201 receives a radio signal transmitted from the mobile station of FIG. 1 and outputs the radio signal. The signal received at the antenna 201 is input via the duplexer 202 to the receiving RF unit 203. The antenna 202 also receives a radio signal via the duplexer 202 from the transmitting RF unit 247 and transmits this radio signal to the base station of FIG. 1.

The receiving RF unit 203 includes an LNA, a down-converter and an ADC. In the receiving RF unit 203, the LNA adjusts the gain of a received signal supplied from the duplexer 202. The down-converter performs down conversion on the signal. The ADC converts the down-converted signal to a digital signal (hereinafter called a digital received baseband signal). The digital received baseband signal is input to the FET unit 204.

The FFT unit 204 performs fast Fourier transform on the digital received baseband signal, converting the signal in a time domain to a signal in a frequency domain. The signal in a frequency domain is divided into segments that are associated with subcarriers, respectively. In the same frame of this signal, signals transmitted from a plurality of mobile stations are subjected to orthogonal frequency division multiplexing. The signal segments are input to the frequency-channel separating unit 205.

The frequency-channel separating unit 205 separates each signal segment supplied from the FFT unit 204 into a pilot channel signal, a CQI channel signal, and a data channel signal. Which subcarriers are allocated to the pilot channel, the CQI channel and the data channel has been notified to the frequency-channel separating unit 205 by the control unit 220, which will be described later.

That is, the frequency-channel separating unit 205 first inputs the signal on the subcarrier associated with the pilot channel notified by the control unit 220, as a pilot channel signal, to the pilot descrambling unit 206. The frequency-channel separating unit 205 then inputs the signal on the subcarrier associated with the CQI channel notified by the control unit 220, as a CQI channel signal, to the CQI-channel demodulating unit 207. Moreover, the frequency-channel separating unit 205 inputs the signal on the subcarrier associated with the data channel notified by the control unit 220, as a data channel signal, to the data-channel demodulating unit 209.

Using a prescribed descrambling code, the pilot descrambling unit 206 descrambles a pilot channel signal supplied from the frequency-channel separating unit 205. The descrambling code has been generated by inverting the scrambling code that has been used to scramble the pilot data in the mobile station. The pilot channel signal the pilot descrambling unit 106 has descrambled is sent, as a pilot signal, to the CQI-channel demodulating unit 207 and the CQI channel decoding unit 208.

The demodulation unit 207 has already been notified, by the control unit 220, of the channel number and modulation scheme of the CQI channel signal that should be extracted. Using the pilot signal supplied from the pilot descrambling unit 206, the CQI-channel demodulation unit 207 first performs channel equalization. Then, the CQI-channel demodulation unit 207 demodulates the CQI channel signal input from the frequency-channel separating unit 205, in accordance with the modulation scheme of the CQI channel signal. The CQI channel signal thus demodulated is input as a CQI signal to the CQI channel decoding unit 208.

The CQI-channel decoding unit 208 decodes the CQI signal supplied from the CQI-channel demodulation unit 207 in accordance with the encoding scheme of the CQI signal. The CQI signal thus decoded is input, as CQI, to the control unit 220. As specified above, the data representing the encoding scheme has been notified by the control unit 220.

The data-channel demodulating unit 209 includes N data-channel demodulators 209-1 to 209-*n*. The control unit 220 has notified the channel number and modulation scheme of the data channel signal to extract to each of the data-channel demodulators 209-1 to 209-*n*.

Using a pilot signal supplied from the pilot descrambling unit 206, each of the data-channel demodulators 209-1 to 209-*n* performs channel equalization. After performing the channel equalization, each data-channel demodulator demodulates the data channel signal input from the frequency-channel separating unit 205, thereby generating a data signal. The data signal is input to the data-channel decoding unit 210.

The data-channel decoding unit 210 includes data-channel decoders 210-1 to 210-*n* associated with the data-channel demodulators 209-1 to 209-*n*, respectively. The data-channel decoders 210-1 to 210-n decode the data signals supplied from the data-channel demodulators 209-1 to 209-n, thereby reproducing the data items (up-data items) received from the respective mobile stations, in accordance with the encoding scheme of the data signals. As described above, the data representing the encoding scheme has been notified by the control unit 220.

The control unit 220 controls some of the other components of the base station of FIG. 2. The control unit 220 includes a scheduling unit 230, which will be described later. In accordance with the data fed back from the mobile station (CQI and Ack/Nack representing receiving response), the amount of data to transmit to the mobile station and the scheduling priority, the scheduling unit 230 determines the schedule of the address of the packet to transmit to the mobile station, in each frame and each resource block. The scheduling unit 230 includes a grouping-rule determining unit 231. The grouping-rule determining unit 231 determines a grouping rule. The control unit 220 notifies the physical-resource allocating unit 245 of the schedule the scheduling unit 230 has determined.

The pilot-signal generating unit 241 applies a prescribed scrambling code to the bit sequence (pilot data) known to the mobile station of FIG. 1, thereby generating a pilot signal. The pilot signal thus generated is input to the modulation unit 244.

The control-channel encoding unit 242 includes a plurality of control channel encoders. Each of the control channel encoders encodes a bit sequence of the control data supplied from the control unit 220 to each mobile station, generating a control signal, in accordance with the encoding scheme that the control unit 220 has notified. The control signal thus generated is input to the modulation unit 244.

The data-channel encoding unit 243 includes a plurality of data channel encoders 243-1 to 243-m. The data-channel encoding unit 243 encodes the data (down data) to transmit to the mobile station in accordance with the encoding scheme notified by the control unit 220, thereby generating a data signal. The data signal thus generated is input to the modulation unit 244.

The modulation unit 244 includes a plurality of modulators 244-1 to 244-m. Each of the modulators 244-1 to 244-m modulates a pilot signal, a control signal and a data signal supplied from the pilot-signal generating unit 241, control-channel encoding unit 242 and data-channel encoding unit 243, respectively. The modulation scheme of the modulators 244-1 to 244-m is a digital modulation scheme such as quadrature-phase shift keying (QPSK) and is designated by the control unit 220. The three signals obtained by modulating the pilot signal, control signal and data signal, respectively, and output from each modulator (hereinafter called a pilot channel signal, control channel signal and data channel signal, respectively) are input to the physical-resource allocating unit 245.

The physical-resource allocating unit 245 allocates the subcarriers notified by the control unit 220, to the pilot channel signal, control channel signal and data channel signal supplied from the modulation unit 244, respectively, in accordance with the schedule notified by the control unit 220. That is, the physical-resource allocating unit 245 performs orthogonal frequency-division multiplexing on the signals addressed in the same frame, which will be transmitted to a plurality of mobile stations. The physical-resource allocating unit 246 inputs the signals thus allocated to the IFET unit 246.

The IFET unit 246 performs inverse fast Fourier transform on the signals allocated to a physical resource and supplied from the physical-resource allocating unit 245. That is, the signals allocated to the physical resource, which are signals in a frequency domain, are converted to a signal in a time domain. The signal in a time domain, coming from the IFET unit 246, is input to the transmission RF unit 247.

The transmission RF unit 247 includes a DAC, an up-converter, and a PA. In the transmission RF unit 247, the DAC receives a signal in a time domain, from the IFET unit 246, and converts the same to an analog signal. The up-converter converts the analog signal to a radio signal. The PA amplifies the radio signal. The transmission RF unit 247 supplies the radio signal via the duplexer 202 to the antenna 2101. The antenna 201 transmits the radio signal in the form of a radio wave.

The technical significance of grouping the allocable resource blocks in accordance with the grouping rule will be explained, in view of the data amount of the CQI. The amount (bits) of the position data about M resource blocks is found in the conventional BestM scheme, by the following equation (2):

$$\text{ceil}(\log_2 C(N,M)) \quad (2)$$

where ceil( ) indicates the process of rounding up the value specified in the parentheses to an integral value. (This definition will be applied to the description that follows.)

In the mobile communication system according to the present embodiment, the amount of the position data about the resource blocks of the group selected (i.e., the number of bits) is derived from the following equation (3):

$$\sum_{i=1}^{L} \text{ceil}(\log_2 C(P\_i, Ma\_i)) \quad (3)$$

Note that the position data about the resource blocks represents the relative positions that the resource blocks take in the group.

To compare the data amount obtained by the equation (3) with the data amount obtained by the equation (2), the following conditional equation (4) is used:

$$\sum_{i=1}^{L} Ma\_i = M \quad (4)$$

Figure 4:
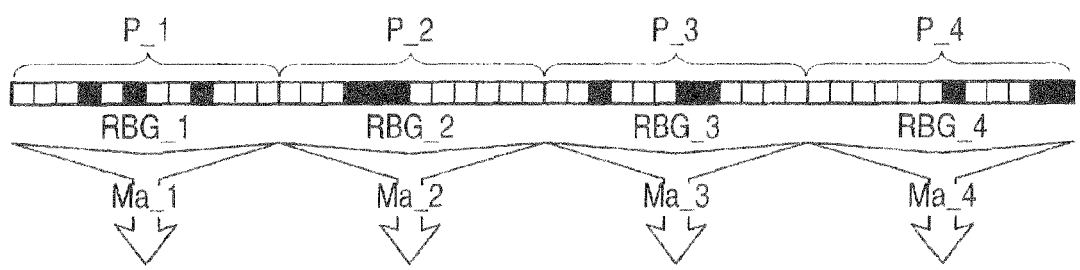
FIG. 4 is a diagram explaining the grouping rule applied in the mobile communication system according to the first embodiment.

Assume that the resource block groups have the same size P, and in each group, resource blocks are selected in the same number Ma, as is illustrated in FIG. 4. That is, the size P is N/L, and the number Ma of blocks selected is M/L. Hence, the equation (3) is equivalent to the following equation (5):

$$\text{ceil}(L \times \log_2 C(N/L, M/L)) \quad (5)$$

The data amount deriving from the equation (5) is smaller than the data amount driving from the equation (2). Since the allocable resource blocks are grouped in accordance with the grouping rule, the data amount can be smaller than in the case where resource blocks are selected in the BestM scheme.

Figure 5:
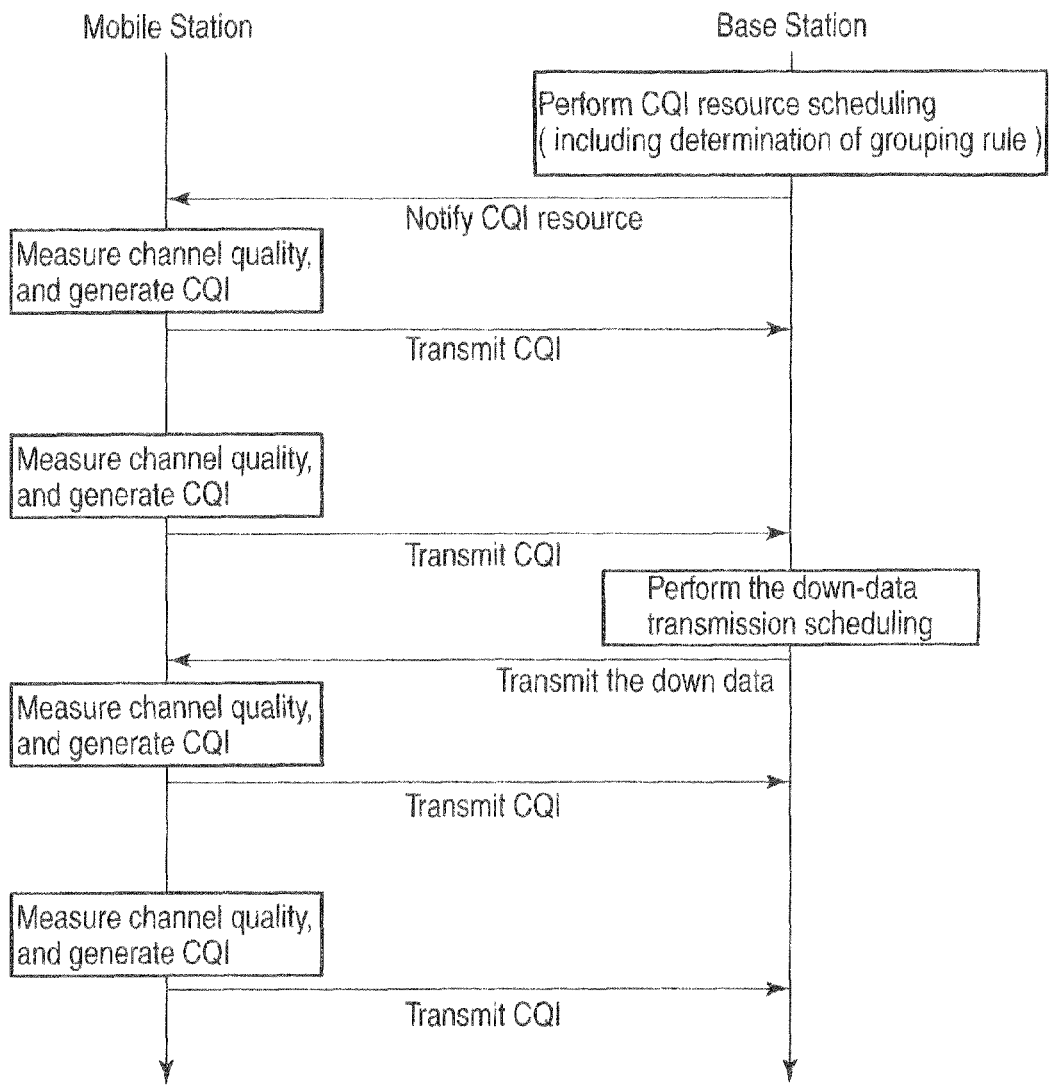
FIG. 5 is a sequence diagram showing how the CQI may be communicated between the mobile station of FIG. 1 and the base station of FIG. 2.

How the CQI may be communicated between the mobile station of FIG. 1 and the base station of FIG. 2 will be explained with reference to the sequence diagram of FIG. 5.

First, the base station performs the scheduling of the CQI resource data and, at the same time, determines the grouping rule. More precisely, the scheduling unit 230 performs the scheduling of the CQI resource, and the grouping-rule determining unit 231 determines the grouping rule. The base station performs the scheduling of the CQI resource data every time communication is started with any mobile station. The CQI resource data contains various items such as time-frequency resource, CQI format and modulation scheme. The time-frequency resource is a set of subcarriers the physical-resource allocating unit 136 superposes on the modulated CQI channel signal in the mobile station. The CQI format defines the data format of the CQI generated by the CQI generating unit 131, and contains a grouping rule. As the CQI format defines, the CQI contains the data item representing the channel quality of Ma resource blocks of each group, which have relatively high channel quality (e.g., average channel quality of the Ma resource blocks) and the data item representing the positions of the Ma resource blocks.

The grouping rule that is described in the CQI format contains parameters, such as the number L of resource block groups, the size P of each resource block group and the number Ma of resource blocks selected in each group. In addition to these parameters, the grouping rule may contain the data that the mobile station needs in order to determine the CQI format uniquely, such as the serial numbers of the resource blocks constituting each group. Further, the mobile station and the base station may preset a number of grouping rule candidates, each having an index. In this case, any candidate can be selected by using the index.

On determining the schedule of the CQI resource, the base station transmits the CQI resource data to each mobile station via the control channel. More specifically, the resource data determined by the scheduling unit 230 of the control unit 220 is transmitted to each mobile station via the control-channel encoding unit 242, modulation unit 244, physical-resource allocating unit 245, IFFT unit 246, transmission RF unit 247, duplexer 202 and antenna 201.

Each mobile station acquires the CQI resource data from the base station. In the mobile station, the CQI resource data is input to the control unit 120 via the antenna 101, duplexer 102, receiving RF unit 103, FFT unit 104, frequency-channel separating unit 105, control-channel demodulating unit 108 and control-channel decoding unit 109. The grouping-rule acquiring unit 121 provided in the control unit 120 acquires the grouping rule contained in the CQI resource data.

The frequency-channel separating unit 105 separates a pilot-channel signal in accordance with the resource allocation data for the pilot channel, which the base station has notified via the common control channel before it starts communicating with the mobile station. The pilot descrambling unit 106 descrambles the pilot channel signal. The pilot channel signal descrambled is input, as a pilot signal, to the channel-quality measuring unit 107. Based on the pilot signal, the channel-quality measuring unit 107 measures the channel quality of each resource block. The result of the measuring is input to the CQI generating unit 131, along with the position data.

The CQI generating unit 131 divides allocable resource blocks into L groups in accordance with the grouping rule the grouping-rule acquiring unit 121 has acquired. Then, the CQI generating unit 131 generates the data representing the channel quality of Ma resource blocks included in each group, which have relatively high channel quality, and also the data representing the positions of Ma resource blocks. Further, the CQI generating unit 131 generates CQI from the data in accordance with the CQI format described above.

The CQI generated by the CQI generating unit 131 is transmitted to the base station via the CQI-channel encoding unit 132, modulation unit 135, physical-resource allocating unit 136, IFET unit 137, and transmission RF unit 138, duplexer 102 and antenna 101.

Thereafter, each mobile station measures the channel quality, generates CQI and transmits the CQI at prescribed intervals or in response to each CQI request transmitted from the base station.

In the base station, the scheduling unit 230 provided in the control unit 220 performs scheduling to transmit down data to a mobile station, by using the CQI transmitted from the mobile station and the data fed back from any other base station. The control unit 220 inputs the result of the scheduling, as control data, to the control-channel encoding unit 242. The control data contains the resource-block position for use in transmitting data to each mobile station, the subframe number and the encoding rate. The control-channel encoding unit 242 encodes the control data. The control data encoded is supplied, along with the down data encoded by the data-channel encoding unit 243, to each mobile station via the modulation unit 244, physical-resource allocating unit 245, IFFT unit 246, transmitting RF unit 247, duplexer 202 and antenna 201.

As described above, any mobile station used in the mobile communication system according to this embodiment is configured to group resource blocks in accordance with a grouping rule and to generate CQI from those of the resource blocks of each group, which have relatively high channel quality. Therefore, the resource blocks whose CQIs the base station can acquire in the mobile communication according to this embodiment are dispersed over a wide band. This ensures a large freedom of scheduling the resources in the base station. Moreover, the data amount of CQI can be reduced.

(Second Embodiment)

A mobile communication system according to a second embodiment of this invention differs from the mobile communication system according to the first embodiment in terms of the grouping rule utilized. Therefore, the grouping rule used in the mobile communication system according to this embodiment will be described below, in detail and in the main.

Figure 6:
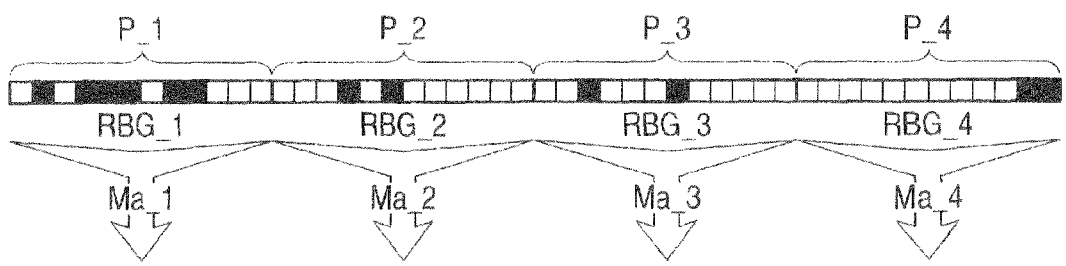
FIG. 6 is a diagram explaining the grouping rule applied in the mobile communication system according to a second embodiment.

In the grouping rule used in the mobile communication system according to the first embodiment, the resource-block groups have the same size P, and the same number Ma of resource blocks are selected from each group. In the grouping rule used in the mobile communication system according to this embodiment, the number Ma of resource blocks selected can differ from one group to another, as is shown in FIG. 6.

The technical significance of grouping the resource blocks in accordance with this grouping rule will be explained.

In the scheduling the scheduling unit 230 provided in the base station, the bands may differ in scheduling priority. That is, of the allocable resource blocks, some should be allocated by the base station to the mobile stations, and others should not be allocated by the base station to the mobile stations. Further, in some cases, the scheduling priority for each band may be known to the scheduling unit 230 before the communication is started and may be fixed (not changing with time).

According to the grouping rule, the number Ma of resource blocks selectable from a group can be relatively large if the group pertains to a band having a high schedule priority, and the number Ma of resource blocks selectable from a group can be relatively small if the group does not pertain to that band. Conversely, the number Ma of resource blocks selectable from a group can be relatively small if the group pertains to a band having a low schedule priority, and the number Ma of resource blocks selectable from a group can be relatively large if the group does not pertain to that band. The base station can therefore acquire a relatively large number of CQIs for the resource blocks that should be allocated to the mobile stations. The base station can thus attain the freedom of scheduling the resources.

(Third Embodiment)

A mobile communication system according to a third embodiment of the invention differs from the mobile communication system according to the first embodiment in terms of the grouping rule utilized. Therefore, the grouping rule used in the mobile communication system according to this embodiment will be described below, in detail and in the main.

Figure 7:
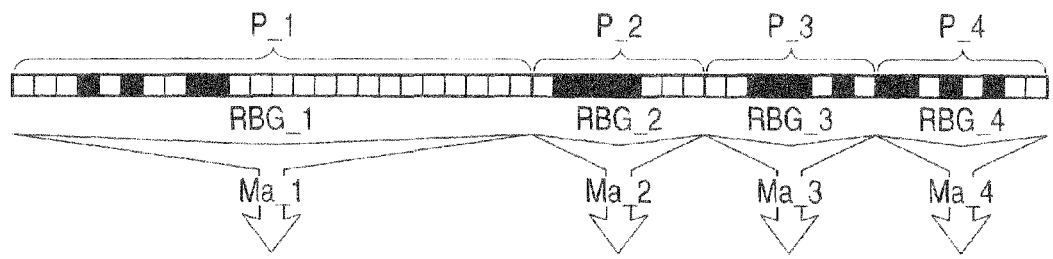
FIG. 7 is a diagram explaining the grouping rule applied in the mobile communication system according to a third embodiment.

In the grouping rule used in the mobile communication system according to the first embodiment, the resource-block groups have the same size P, and the same number Ma of resource blocks are selected from each group. In the grouping rule used in the mobile communication system according to this embodiment, the resource-block groups have different sizes, as illustrated in FIG. 7.

The technical significance of grouping the resource blocks in accordance with this grouping rule will be explained.

In the scheduling the scheduling unit 230 provided in the base station, the bands may differ in scheduling priority. That is, of the allocable resource blocks, some should be allocated by the base station to the mobile stations, and others should not be allocated by the base station to the mobile stations. Further, in some cases, the scheduling priority for each band may be known to the scheduling unit 230 before the communication is started, and may be fixed.

According to the grouping rule, a resource-block group pertaining to a band having a high schedule priority can have a relatively small size P, and other resource-block group can have a relatively large size P. Conversely, a resource-block group pertaining to a band having a low schedule priority can have a relatively large size P, and other resource-block group can have a relatively small size P. The base station can therefore acquire a relatively large number of CQIs for the resource blocks that should be allocated to the mobile stations. The base station can thus attain the freedom of scheduling the resources.

(Fourth Embodiment)

A mobile communication system according to a fourth embodiment of the invention differs from the mobile communication system according to the first embodiment in terms of the grouping rule utilized. Therefore, the grouping rule used in the mobile communication system according to this embodiment will be described below, in detail and in the main.

Figure 8:
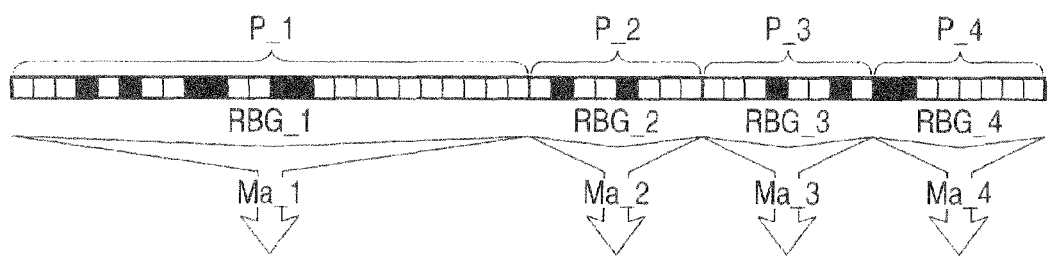
FIG. 8 is a diagram explaining the grouping rule applied in the mobile communication system according to a fourth embodiment.

In the grouping rule used in the mobile communication system according to the first embodiment, the resource-block groups have the same size P, and the same number Ma of resource blocks are selected from each group. In the grouping rule used in the mobile communication system according to this embodiment, the resource-block groups have different sizes P and the number Ma of resource blocks selected can differ from one group to another, as is illustrated in FIG. 8. Nonetheless, the ratio of the number Ma to the size P is common to all resource-block groups.

The technical significance of grouping the resource blocks in accordance with this grouping rule will be explained.

In the base station, the scheduling priority of band may change with time while the scheduling unit 230 is scheduling the resource allocation. That is, of one resource-block group, some resource blocks should be allocated by the base station to the mobile station and the other resource blocks should not be allocated by the base station to the mobile station. Further, the scheduling priority may change for each band though the band for which the scheduling priority changes is known to the scheduling unit 230 before the start of communication, or the scheduling priority may not be known to the scheduling unit 230 at all.

According to the groping rule, the size P can be set to any value. One or more resource-block groups can therefore be set as groups of bands for which the scheduling priority changes. Thus, the same scheduling priority can be applied to all resource blocks of each group. In addition, the resource blocks whose CQIs the base station can acquire are dispersed over a wide band as in the first embodiment, because the ratio of the number Ma to the size P is identical in all resource-block groups.

(Fifth Embodiment)

A mobile communication system according to a fifth embodiment of the invention differs from the mobile communication system according to the first embodiment in terms of the grouping rule utilized. Therefore, the grouping rule used in the mobile communication system according to this embodiment will be described below, in detail and in the main.

Figure 9:
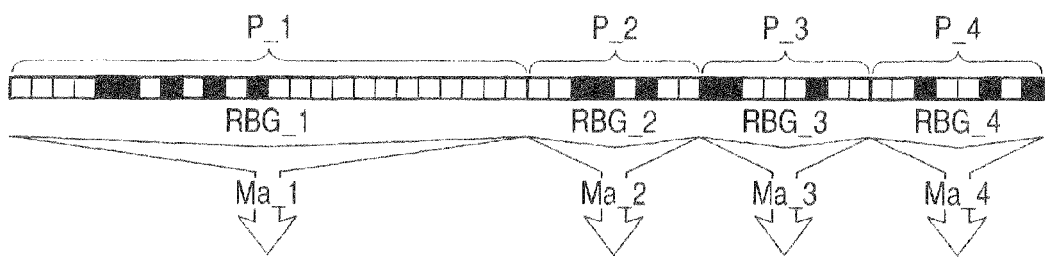
FIG. 9 is a diagram explaining the grouping rule applied in the mobile communication system according to a fifth embodiment.

In the grouping rule used in the mobile communication system according to the first embodiment, the resource-block groups have the same size P, and the same number Ma of resource blocks are selected from each group. In the grouping rule used in the mobile communication system according to this embodiment, the resource-block groups may have different sizes P and the number Ma of resource blocks selected may differ from one group to another, as is illustrated in FIG. 9. Further, unlike in the fourth embodiment, the ratio of the number Ma to the size P is not limited in particular. This grouping rule can help finely set the size P and the number Ma in accordance with the scheduling priority set for each band.

(Sixth Embodiment)

A mobile communication system according to a sixth embodiment of the invention differs from the mobile communication system according to the first embodiment in terms of the grouping rule utilized. Therefore, the grouping rule used in the mobile communication system according to this embodiment will he described below, in detail and in the main.

Figure 10A:
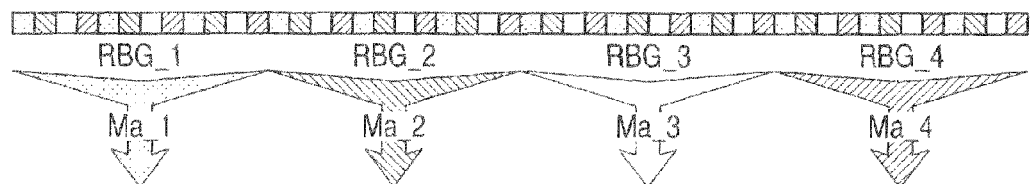
FIG. 10A is a diagram explaining the grouping rule applied in the mobile communication system according to a sixth embodiment.
Figure 10B:
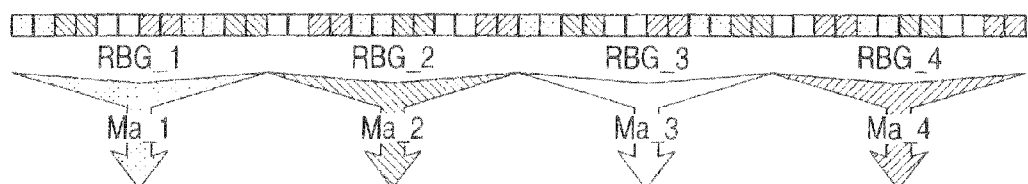
FIG. 10B is a diagram explaining the grouping rule applied in the mobile communication system according to the sixth embodiment.
Figure 10C:
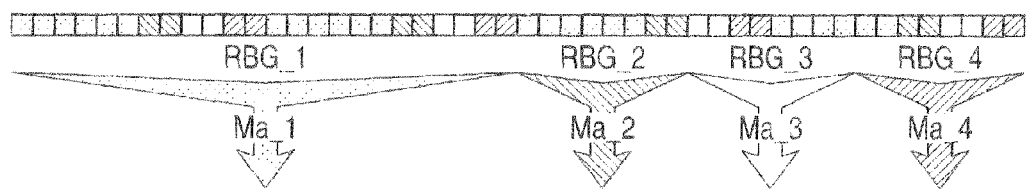
FIG. 10C is a diagram explaining the grouping rule applied in the mobile communication system according to the sixth embodiment.
Figure 10D:
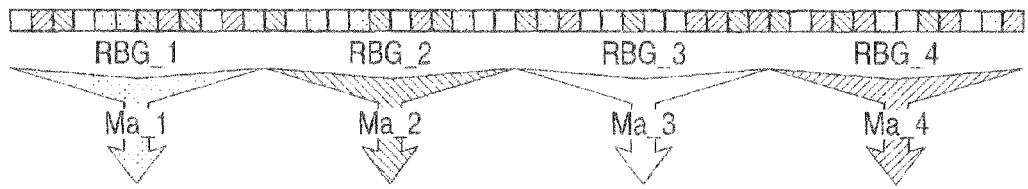
FIG. 10D is a diagram explaining the grouping rule applied in the mobile communication system according to the sixth embodiment.
Figure 10E:
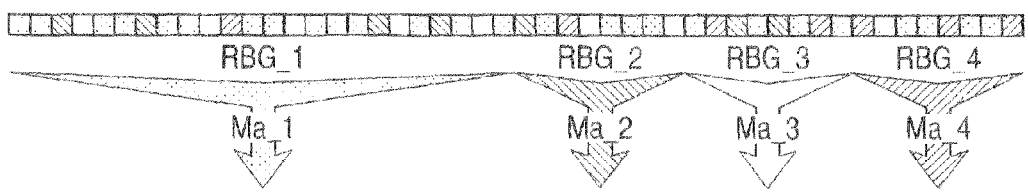
FIG. 10E is a diagram explaining the grouping rule applied in the mobile communication system according to the sixth embodiment.

The grouping rules utilized in the mobile communication systems according to the first to fifth embodiments are based on the assumption that the resource blocks of each block are continuous on the frequency axis. The grouping rule used in the mobile communication system according to this embodiment is valid in the case where the resource blocks of each block are discontinuous on the frequency axis, as shown in FIGS. 10A to 10E. That is, the grouping rule can be applied to group resource blocks of discontinuous frequency in a regular fashion, as shown in FIGS. 10A to 10C, or in an irregular fashion, as shown in FIGS. 10D to 10E.

This grouping rule achieves not only the same advantages as in the mobile communication systems according to the first to fourth embodiments, but also an advantage in respect of frequency diversity. The base station can therefore accomplish a resource allocation that is robust particularly to frequency selectivity fading.

(Seventh Embodiment)

A mobile communication system according to a seventh embodiment of the invention differs from the mobile communication system according to the first embodiment in terms of the grouping rule utilized. Therefore, the grouping rule used in the mobile communication system according to this embodiment will be described below, in detail and in the main.

Figure 11:
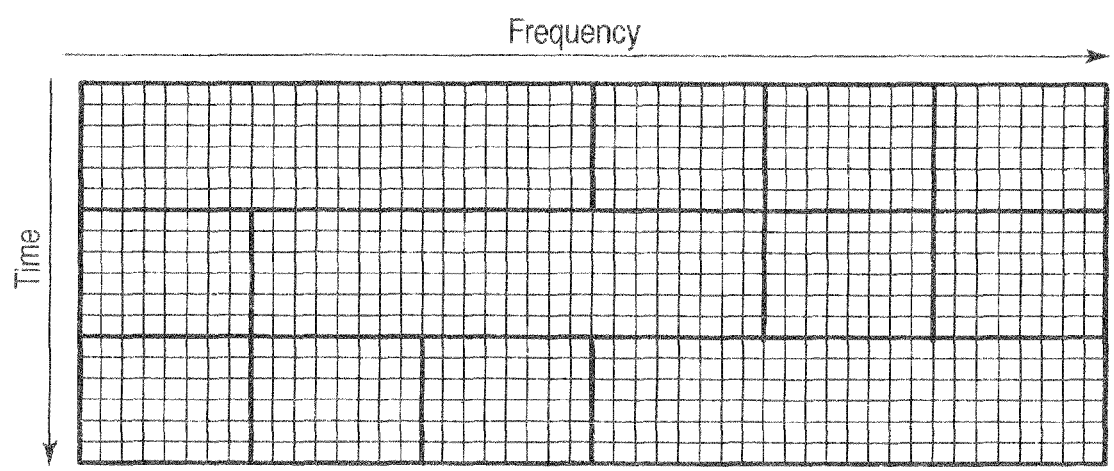
FIG. 11 is a diagram explaining a grouping rule applied in the mobile communication system according to a seventh embodiment.

The grouping rules utilized in the mobile communication systems according to the first to sixth embodiments do not change with time at all. By contrast, the grouping rule used in the mobile communication system according to this embodiment may change with time, as illustrated in FIG. 11. For example, the grouping rule may change for each X-subframe period (X being a natural number). X may be set before the start of communication or may be notified, as a parameter, from the CQI resource to each mobile station.

Figure 12:
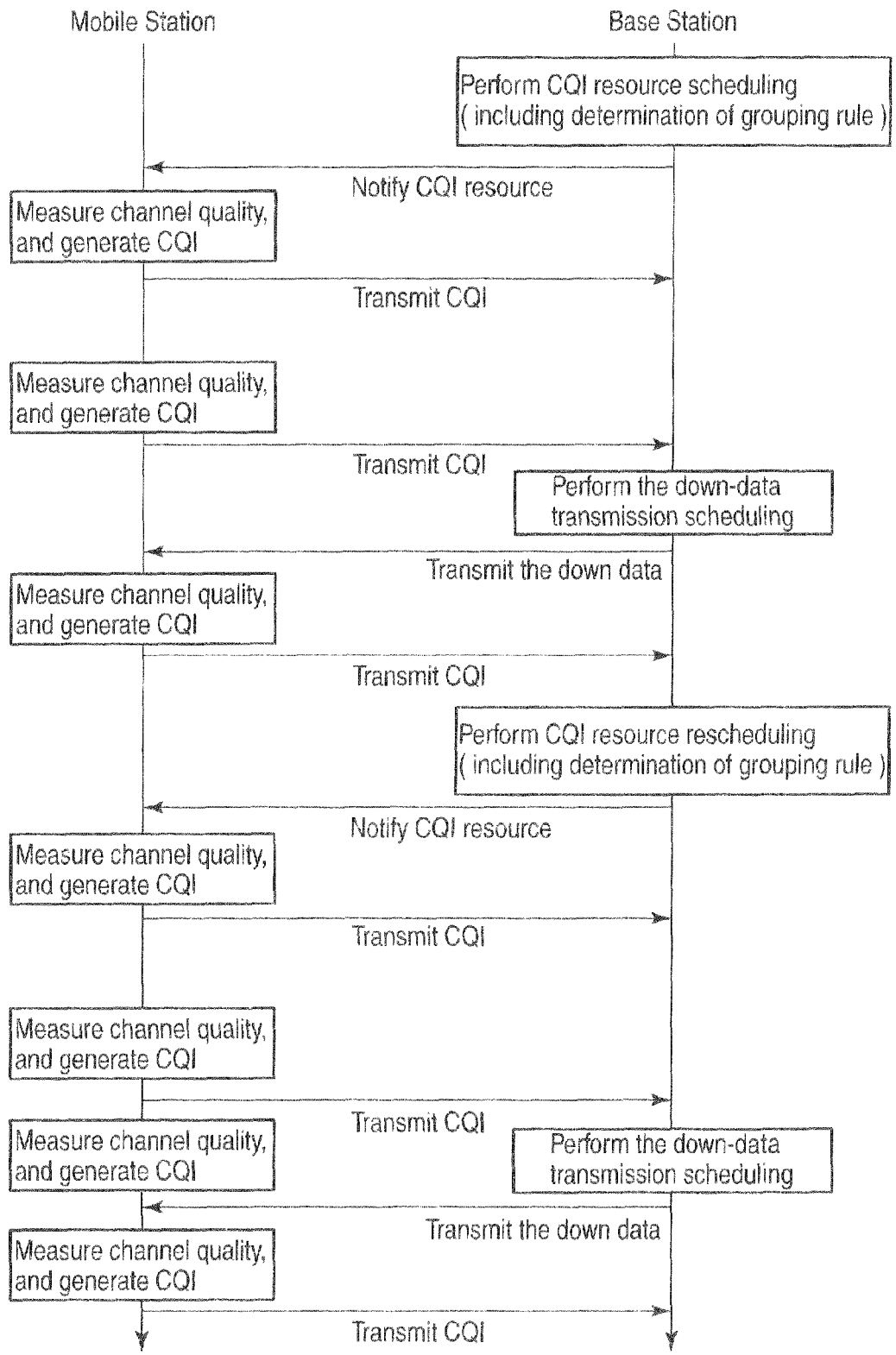
FIG. 12 is a sequence diagram showing another example of the process shown in FIG. 5.

Before the start of communication, the base station may give each mobile station the data representing how the grouping rule changes with time. Alternatively, as shown in FIG. 12, the base station may re-schedule the CQI resource during the communication, notifying any mobile station of the change of the grouping rule. More precisely, the grouping-rule acquiring unit 121 of the base station may over-write the grouping rule to be applied to the mobile station.

This grouping rule achieves not only the same advantages as in the mobile communication systems according to the first to fifth embodiments, but also an advantage in respect of time diversity. That is, the resource blocks whose CQIs the base station can easily acquire are dispersed on the time axis even if the Doppler fluctuation is small in the mobile station.

(Eighth Embodiment)

A mobile communication system according to an eighth embodiment of the invention differs from the mobile communication system according to the first embodiment in terms of the grouping rule utilized. Therefore, the grouping rule used in the mobile communication system according to this embodiment will be described below, in detail and in the main.

In the mobile communication systems according to the first to seventh embodiments, one grouping rule is set for the base station and one mobile station, and another grouping rule is set for the base station and another mobile station. In the mobile communication system according to this embodiment, one grouping rule is applied to the base station and all mobile stations. In other words, the same grouping rule is applied to all mobile stations that communicate with the base station.

The technical significance of grouping the resource blocks in accordance with this grouping rule will be explained.

As shown in FIG. 13, resource-block groups preferentially scheduled for the base stations A, B and C should be dispersed, each not overlapping any other, in order to avoid mutual interference of the geographically adjacent base stations A, B and C. As FIG. 14 shows, the grouping rules applied to the base stations A to C indeed group the allocable resource blocks, forming resource-block groups RBG_1 to RB_3. However, the number Ma of resource blocks selected differs from one base station to another. More specifically, the number Ma is relatively large for the resource-block group RB_3 in the grouping rule for the base station A, is relatively large for the resource-block group RB_1 in the grouping rule for the base station B, and is relatively large for the resource-block group RB_2 in the grouping rule for the base station C. That is, the resource-block groups preferentially scheduled for the base stations A, B and C do not overlap one another. As a result, the ratio of blocks not scheduled in the base station is high in a group having low priority, whereas the ratio of blocks scheduled in the base station is high in a group having high priority. The base stations can therefore be prevented from interfering one another. Moreover, if the transmission power is set to a small value, the interference of each base station with any other base station can be suppressed because the resource blocks scheduled in any group having low priority have relatively high channel quality. The grouping rule mentioned above can be expected to greatly increase the throughput of the mobile communication system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication terminal comprising:
a measuring unit configured to measure each of channel qualities of resource blocks that a base station can allocate;
a generating unit configured to divide the resource blocks into a plurality of groups, to generate quality data representing the channel qualities of a prescribed number of resource blocks included in each of the groups, which have relatively high channel quality, and to generate position data representing the positions which the resource blocks which have relatively high channel quality take in each of the groups;
an encoding unit configured to encode the quality data and the position data to obtain encoded data;
a modulation unit configured to modulate the encoded data to obtain a modulated signal; and
a transmitting unit configured to transmit the modulated signal to the base station.

2. The terminal according to claim 1, wherein each of the groups consists of the same number of resource blocks.

3. The terminal according to claim 1, wherein the prescribed numbers are the same in all the groups.

4. The terminal according to claim 1, wherein at least two of the groups differ in terms of the number of resource blocks included in each group.

5. The terminal according to claim 1, wherein at least two of the groups differ in terms of the prescribed number.

6. The terminal according to claim 1, wherein a ratio of the prescribed number to the number of resource blocks included in each group is the same in all the groups.

7. The terminal according to claim 1, wherein all resource blocks included in one of the groups are continuous on a frequency axis.

8. The terminal according to claim 1, wherein, of the resource blocks included in one of the groups, one resource block is discontinuous to any other resource block on a frequency axis.

9. A wireless communication terminal comprising:
a measuring unit configured to measure each of channel qualities of resource blocks that a base station can allocate;
an acquiring unit configured to acquire a grouping rule;
a generating unit configured to divide the resource blocks into a plurality of groups in accordance with the grouping rule, to generate quality data representing the channel qualities of a prescribed number of resource blocks included in each of the groups, which have relatively high channel quality, and to generate position data representing the positions which the resource blocks which have relatively high channel quality take in each of the groups;
an encoding unit configured to encode the quality data and the position data to obtain encoded data;
a modulation unit configured to modulate the encoded data to obtain a modulated signal; and
a transmitting unit configured to transmit the modulated signal to the base station.

10. The terminal according to claim 9, wherein the grouping rule changes with time.

11. The terminal according to claim 9, wherein the grouping rule is identical to the grouping rule used in any other wireless terminal that communicates with the base station.

12. A wireless communication method used in a wireless communication terminal including a measuring unit, a generating unit, an encoding unit, a modulation unit, and a transmitting unit, the wireless communication method comprising:

measuring, with the measuring unit, each of channel qualities of resource blocks that a base station can allocate;
dividing, with the generating unit, the resource blocks into a plurality of groups;
generating, with the generating unit, quality data representing the channel qualities of a prescribed number of resource blocks included in each of the groups, which have relatively high channel quality;
generating, with the generating unit, position data representing the positions which the resource blocks which have relatively high channel quality take in each of the groups;
encoding, with the encoding unit, the quality data and the position data to obtain encoded data;
modulating, with the modulation unit, the encoded data to obtain a modulated signal; and
transmitting, with the transmitting unit, the modulated signal to the base station.

13. The method according to claim 12, wherein each of the groups consists of the same number of resource blocks.

14. The method according to claim 12, wherein the prescribed numbers are the same in all the groups.

15. The method according to claim 12, wherein at least two of the groups differ in terms of the number of resource blocks included in each group.

16. The method according to claim 12, wherein at least two of the groups differ in terms of the prescribed number.

17. The method according to claim 12, wherein a ratio of the prescribed number to the number of resource blocks included in each group is the same in all the groups.

18. The method according to claim 12, wherein all resource blocks included in one of the groups are continuous on a frequency axis.

19. The method according to claim 12, wherein, of the resource blocks included in one of the groups, one resource block is discontinuous to any other resource block on a frequency axis.

* * * * *